US012789365B2

(12) United States Patent
Bacher et al.

(10) Patent No.: US 12,789,365 B2
(45) Date of Patent: Nov. 10, 2026

(54) SIMULATION OF ROBOTICS DEVICES USING A NEURAL NETWORK SYSTEMS AND METHODS

(71) Applicants: DISNEY ENTERPRISES, INC., Burbank, CA (US); ETH Zurich, Zurich (CH)

(72) Inventors: Moritz Niklaus Bacher, Zurich (CH); Christian Gabriel Schumacher, Aarau (CH); Komath Naveen Kumar, Burbank, CA (US); Lars Espen Knoop, Birmensdorf (CH); Agon Serifi, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 393 days.

(21) Appl. No.: 18/232,239

(22) Filed: Aug. 9, 2023

(65) Prior Publication Data

US 2024/0051124 A1 Feb. 15, 2024

Related U.S. Application Data

(60) Provisional application No. 63/396,584, filed on Aug. 9, 2022.

(51) Int. Cl.
*B25J 15/00* (2006.01)
*B25J 9/16* (2006.01)

(52) U.S. Cl.
CPC ............ *B25J 9/161* (2013.01); *B25J 9/1605* (2013.01); *B25J 9/163* (2013.01); *B25J 9/1653* (2013.01); *B25J 9/1664* (2013.01)

(58) Field of Classification Search
CPC . B25J 9/161; B25J 9/1605; B25J 9/163; B25J 9/1653; B25J 9/1664; B25J 9/1671; G05B 2219/39271
See application file for complete search history.

(56) References Cited

U.S. PATENT DOCUMENTS 6,611,823 B1 * 8/2003 Selmic ................ G05B 13/027 706/14
10,800,040 B1 * 10/2020 Beckman .............. B25J 9/1605
(Continued)

FOREIGN PATENT DOCUMENTS

CN 108228975 B 8/2020
CN 113255208 A 8/2021
(Continued)

OTHER PUBLICATIONS

He, Shouling, "Neural Predictive Force Control for a Hydraulic Actuator: Simulation and Experiment", Applied Artificial Intelligence, SSN: 0883-9514 (Print) 1087-6545 (Online) Journal homepage: https://www.tandfonline.com/loi/uaai20, 2009.

*Primary Examiner* — Ricardo I Viscarra
(74) *Attorney, Agent, or Firm* — Dorsey & Whitney LLP

(57) ABSTRACT

Systems and methods for training a neural network to predict states of a robotics device are disclosed. Robotics data is received for a robotics device, including indications of a set of components, a digital simulation of the robotics device, and measurement data received from a sensor associated with the robotics device. The set of components includes an actuator and a structural element. A training dataset is generated using the received robotics data. Generating the training dataset includes comparing the measurement data with simulated measurement data based on the digital simulation. A neural network is trained using the generated training dataset to modify the digital simulation of the robotics device to predict a state of the robotics device, such as a position, motion, electrical quantity, or other. When trained, the neural network is applied to predict states of the robotics device or a different robotics device.

18 Claims, 3 Drawing Sheets

(56) References Cited

U.S. PATENT DOCUMENTS

| | | | | |
|---|---|---|---|---|
| 11,213,946 | B1 * | 1/2022 | Bai | G05D 1/0221 |
| 11,494,632 | B1 * | 11/2022 | Bai | B25J 9/1612 |
| 11,971,709 | B2 * | 4/2024 | Yamaguchi | G06N 3/0464 |
| 2018/0349527 | A1 * | 12/2018 | Li | B25J 9/1605 |
| 2020/0306960 | A1 * | 10/2020 | Handa | B25J 9/1605 |
| 2021/0107157 | A1 * | 4/2021 | Bai | B25J 9/1692 |
| 2021/0162589 | A1 * | 6/2021 | Tan | B25J 9/1605 |
| 2023/0297068 | A1 * | 9/2023 | Li | B25J 9/1697 700/98 |
| 2024/0051124 | A1 * | 2/2024 | Bacher | B25J 9/161 |
| 2024/0131711 | A1 * | 4/2024 | Itou | B25J 9/1669 |

FOREIGN PATENT DOCUMENTS

| | | | |
|---|---|---|---|
| CN | 112286139 | B | 10/2021 |
| CN | 114326390 | A | 4/2022 |
| CN | 109376413 | B | 8/2022 |

* cited by examiner

SIMULATION OF ROBOTICS DEVICES USING A NEURAL NETWORK SYSTEMS AND METHODS

CROSS REFERENCE TO RELATED APPLICATION

This application claims priority and benefit of the Applicant's U.S. Provisional Application No. 63/396,584, filed on Aug. 9, 2022, titled "Transformer-based Neural Augmentation of Simulation Representations of Robots," which is incorporated herein by reference in its entirety for all purposes.

FIELD

The described embodiments relate generally to simulation of robotics devices. Specifically, disclosed embodiments relate to improved simulation of robotics devices using a neural network or other artificial intelligence (AI) and/or machine learning (ML) model.

BACKGROUND

Robotics simulation can be used to create a digital representation/simulation of a physical robotics device independent of the physical robotics device, such as to design a robotics device before it is built, to simulate operations performed by an existing robotics device, and/or to make modifications to an existing robotics device. Robotics simulation can refer to or use various robotics simulation applications. For example, in mobile robotics applications, behavior-based robotics simulators allow users to create environments modeling robotic devices to program digital simulations of robotics devices to interact with these environments. Other applications and/or techniques can also be used to generate and/or operate digital simulations. Digital simulations of robotics devices can be used, for example, in relation to animatronics, amusement devices, commercial or industrial robotics devices, medical devices, military robots, agricultural robots, domestic robots, and so forth.

SUMMARY

The following Summary is for illustrative purposes only and does not limit the scope of the technology disclosed in this document.

In an embodiment, a computer-implemented method of training a neural network to predict states of a robotics device is disclosed. Robotics data is received for at least one robotics device, the robotics data including indications of a set of components, a digital simulation of the at least one robotics device, and measurement data received from at least one sensor associated with the at least one robotics device. The set of components includes at least one actuator and at least one structural element. A training dataset is generated using the received robotics data. Generating the training dataset includes comparing the measurement data with simulated measurement data based on the digital simulation. A neural network is trained using the generated training dataset to modify the digital simulation of the at least one robotics device to predict a state of the at least one robotics device.

In some implementations, training the neural network includes training a first model associated with a first component class and training a second model associated with a second component class. In some implementations, the first component class is an actuator class and the second component class is a structural element class. In some implementations, the first model and the second model each comprise a State Augmentation Transformer.

In some implementations, predicting the state of the at least one robotics device includes receiving an initial estimate of the state and generating an additive residual value for the state.

In some implementations, the method further includes applying the trained neural network to the at least one robotics device or a different robotics device to predict a future state. In some implementations, the different robotics device includes a different set of components.

In some implementations, the predicted state of the at least one robotics device comprises a movement or position of the at least one actuator, the at least one structural element, or both the at least one actuator and the at least one structural element.

In some implementations, the at least one sensor comprises a sensor included in the at least one actuator.

In some implementations, the set of components includes a mechanical element, an electrical element, or both. In some implementations, the measurement data includes electrical measurements associated with the electrical element.

In some implementations, the at least one robotics device includes a plurality of subsystems and the neural network comprises a model for each subsystem of the plurality of subsystems.

In some implementations, the method further includes providing a control signal to the at least one robotics device, the control signal indicating a command to be executed by the at least one robotics device, generating the measurement data based on performance of the command, providing the control signal to the digital simulation of the at least one robotics device, and generating the simulated measurement data based on simulated performance of the command by the digital simulation of the at least one robotics device.

In some implementations, the digital simulation of the at least one robotics device comprises a graphic representation.

In some implementations, the method further includes generating a testing dataset, evaluating accuracy of the trained neural network using the testing dataset, and retraining the trained neural network based on comparing the accuracy of the trained neural network to a threshold value.

In another embodiment, a system is disclosed including one or more processors and one or more memories carrying instructions configured to cause the one or more processors to perform the foregoing methods.

In yet another embodiment, a computer-readable medium is disclosed carrying instructions configured to cause one or more computing systems or one or more processors to perform the foregoing methods.

DETAILED DESCRIPTION

Figure 1:
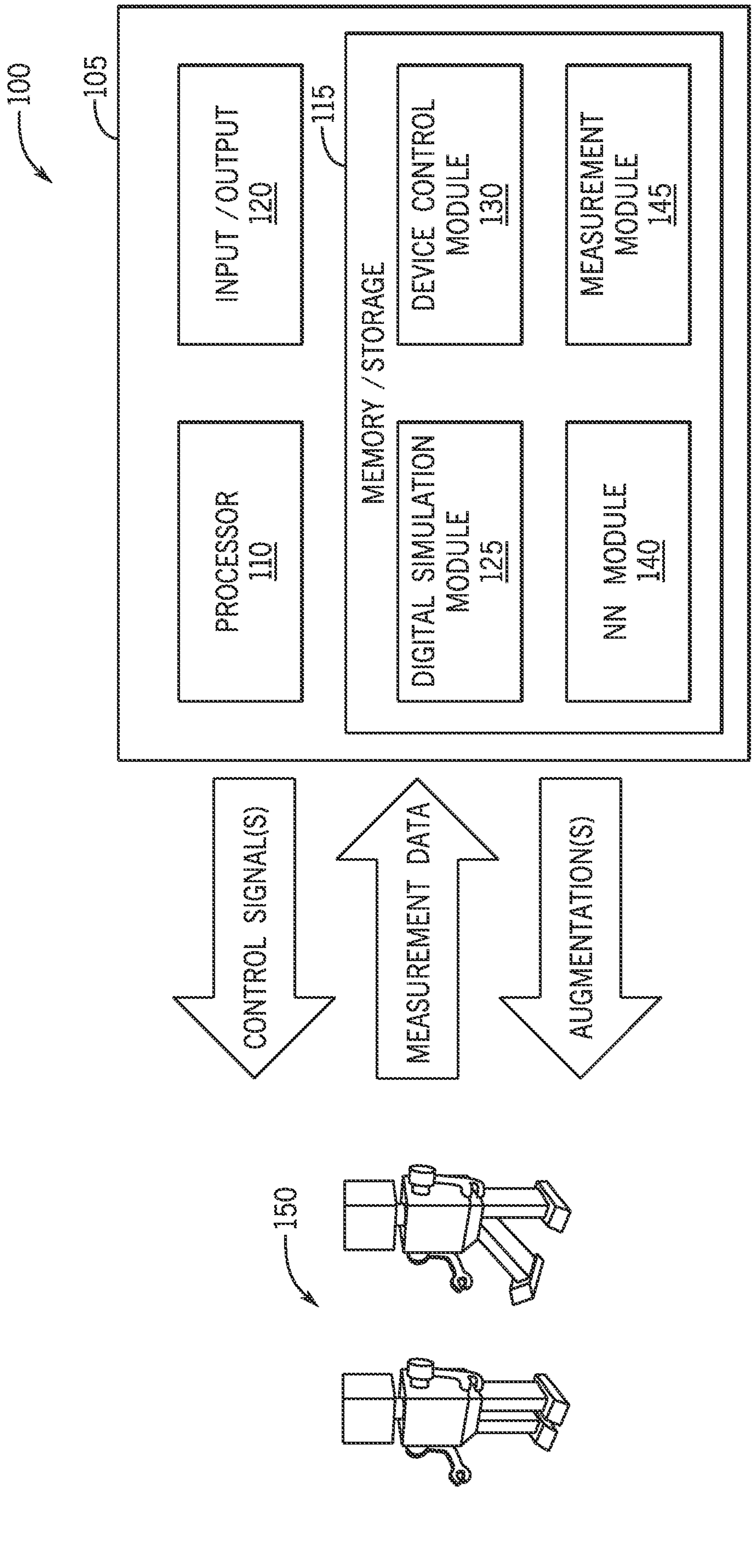
FIG. 1 is block diagram illustrating an environment in which a robotics device simulation system operates, in some implementations.

Existing robotics simulators allow a user to generate and operate digital simulations of robotics devices, but such systems suffer from various technical problems, such as substantial gaps between the simulated behavior or performance and the real-life behavior or performance "sim-to-real gaps". For example, existing systems may fail to adequately simulate behaviors/movements or predict states of robotics devices because they are unable to adequately represent various features of robotics devices. Some existing systems lack the ability to accurately model friction in one or more components, backlash in gearboxes, control loops, or other behaviors that may be unpredictable or difficult to model. Such systems may be based on flawed and/or incomplete information or assumptions, such as models that do not account for friction or deformation of structural elements. Additionally, existing systems are not sufficiently flexible or scalable. For example, existing systems may not be transferrable from one actuator type to another.

Accordingly, there is a need for technologies to overcome the foregoing problems and provide other benefits. For example, there is a need for improved systems for simulation of robotics devices, such as systems that augment and/or modify digital simulations based on real-world measurements that are used to train artificial intelligence (AI) and/or machine learning (ML) models. Additionally, there is a need for systems that are flexible and scalable, such as systems that model components based on their observed behaviors and/or functions.

Disclosed herein are systems and related methods for predicting states of robotics devices ("system" or "robotics device simulation system"). As used herein, predicting a state can refer to predicting one or more movements/motions, positions, electrical quantities (e.g. voltage, wattage, or current values) and/or other physical characteristics, and/or performance of one or more tasks by at least a portion of a robotics device. For example, the system can provide a command for a robotics device and predict a position of one or more elements of the robotics device after performance of the command, or augment a prediction made by a different system (e.g., a software robotics simulator). A state can refer to a time-varying state, such as a position or other characteristic of one or more components at a particular time. In some implementations, the system uses a neural network and/or other AI or ML model. The robotics device simulation system can be used to augment a digital simulation of a robotics device. For example, the system can determine a correction factor or a modified prediction of a state of one or more components or elements of a robotics device, such as an actuator or structural element (i.e., reducing the sim-to-real gap). The system can be used to modify an existing digital simulation of a robotics device and/or to generate a digital simulation of a robotics device. The system can use a neural network or other model and measurement data from one or more sensors to predict states of the robotics device, such as movements or positions of one or more components or elements of the robotics device. In some implementations, the system trains one or more models, such as neural networks, AI models, or ML models.

Advantages of the disclosed technology include, without limitation, increased accuracy in digital simulations of robotics devices. That is, the system can more accurately model and/or predict behaviors, states, movements, and so forth of robotics devices, such that a digital simulation of a robotics device provides an improved representation of a corresponding physical robotics device. This can further decrease time and effort needed to test, model, and/or generate a robotics device, such as for planning a robotics device that will be built or planning modifications to an existing robotics device. Additionally, the disclosed technology can implement a transformer-based architecture, such as an architecture based on a Temporal Fusion Transformer, which existing systems do not use for augmentations of simulation representations.

As used herein, a robotics device can refer to a device and/or system comprising one or more actuators and one or more structural elements. An actuator can be a component or element configured to move and/or control a mechanism, component, element, system, or subsystem, such as translating and/or rotating a structural element, opening a valve, or the like. An actuator can use and/or comprise a control device and/or an energy source. An actuator can be controlled or operated using, for example, electric currents or signals, pneumatic devices, hydraulic fluid pressure, and/or other electronic and/or mechanical means. An actuator can be used to perform various motions, such as linear motion, rotational motion, or combinations thereof. An actuator can comprise, for example, one or more motors and/or hydraulic cylinders. A structural element can comprise, for example, a rigid or substantially rigid body of any shape, such as a cylindrical object, a disk, a gear, an object of an irregular shape, or the like. A structural element can be made from various materials or combinations of materials, such as metal, plastic, wood, carbon fiber, fiberglass, glass, rubber, resin, composite materials, and so forth. Actuators and structural elements can be coupled in various ways to form a robotics device, such as a robotic arm, an animatronic device, or the like. In some implementations, a robotics device can include other kinds of elements or components, such as sensors, mechanical elements, electrical elements, and so forth. A robotics device can comprise at least a portion of a robot. Robotics devices can be fully or partially autonomous and/or controlled by one or more users.

FIG. 1 is block diagram illustrating an environment 100 in which a robotics device simulation system 105 operates. The environment 100 includes the system 105 and one or more robotics devices 150 controlled and/or evaluated using the system 105. The robotics devices 150 can include at least one controller and/or processor for executing instructions, such as commands provided by the system 105. For example, the system 105 can provide one or more control signals for a command to be executed by the robotics devices 150, and the same one or more control signals are provided to a digital simulation of the one or more robotics devices 105 stored and/or provided by a digital simulation module 125 of the system 105. The system 105 receives measurement data via one or more sensors indicating a current state of the robotics devices 150 after execution of the one or more control signals (e.g., a position of one or more elements of the robotics devices 150), and the system 105 compares the current state of the robotics devices 150 to a predicted state of the robotics devices 150 generated using the digital simulation of the one or more robotics devices 105.

Comparisons between the current state and the predicted state can be used to train and/or provide one or more models provided by the neural network module 140, such as AI or ML models, to generate augmentations, which can be correction factors and/or corrected predictions of states of the one or more robotics devices 150. When trained, the one or more models can be used by the system 105 to generate augmentations. For example, the system can create more accurate "digital twins" of a robotics device, allowing faster simulation to deployment as the gaps in conventional simulation to real deployment are reduced via the augmentations generated by the trained models.

The system 105 comprises at least one processor 110, which can be a central processing unit (CPU) and/or one or more hardware or virtual processing units or portions thereof (e.g., one or more processor cores). The at least one processor 110 can be used to perform calculations and/or execute instructions to perform operations of the system 105. The system 105 further comprises one or more input/output components 120. The input/output components 120 can include, for example, a display to provide one or more interfaces provided by the system 105, to display data, to display graphical representations of digital simulations of robotics devices 150, and/or to receive one or more inputs for the system 105. Additionally or alternatively, input/output components 120 can include various components for receiving inputs, such as a mouse, a keyboard, a touchscreen, a biometric sensor, a wearable device, a device for receiving gesture-based or voice inputs, and so forth. In an example implementation, the input/output components 120 are used to provide one or more interfaces for configuring a digital simulation of the robotics devices 150, receiving inputs to control the robotics devices 150 and the digital simulations thereof (e.g., typed inputs provided using a keyboard, selections of hardware and/or software buttons or icons, and/or voice or gesture commands), and/or for providing indications of augmentations, correction factors, and/or corrected digital simulations of the robotics devices 150.

The system 105 further comprises one or more memory and/or storage components 115, which can store and/or access modules of the system 105, the modules including at least a digital simulation module 125, a device control module 130, a neural network module 140, and/or a measurement module 145. The memory and/or storage components 115 can include, for example, a hardware and/or virtual memory, and the memory and/or storage components 115 can include non-transitory computer-readable media carrying instructions to perform operations of the system 105 described herein.

The digital simulation module 125 stores, accesses, and/or provides one or more digital simulations of robotics devices 150 (e.g., digital twins). The digital simulations include indications of a set of components of the robotics devices 150, including at least one actuator and at least one structural element. In some implementations, the digital simulations include indications of other elements or components, such as electrical components, mechanical components, sensors, peripheral and/or accessory devices, and so forth. In some implementations, the digital simulations provided by the digital simulation module 125 can include one or more environments in which the digital simulations of the robotics devices 150 can operate. In some implementations, the digital simulation module 125 provides graphic representations of the digital simulations and/or the environments. Digital simulations provided by the digital simulation module 125 can be controlled using one or more control signals and/or commands provided by the device control module 130, such that the digital simulations can perform operations and/or execute instructions (e.g., to move or perform defined tasks).

Digital simulations provided by the digital simulation module 125 can be used to determine or predict a time-varying state of a robotics device 150 based on forces and/or torques on components or elements of the robotics device 150, based on Newton's laws of motion. A state can comprise, for example, position, orientation, and/or velocity (e.g., linear or angular velocity) of one or more components of a robotics device 150. Additionally or alternatively, a state can comprise other characteristics, such as voltage, current, resistance, impedance, acceleration, temperature, and so forth. The digital simulation may implement a constraint-based formulation, whereby forces and torques transferred between components arise from constraints formulated between said components.

The device control module 130 provides control signals comprising commands to be executed by the robotics devices 150 and the digital simulations provided by the digital simulation module 125. For example, the device control module 130 provides a command for a robotics device 150 to perform a task, and the same command is provided to a digital simulation of the same robotics device 150 to perform the same task. The commands can be to perform representative reference motions by the robotics device 150 and the digital simulation. The digital simulation module 125 is used to predict a state of the robotics device 150 using the digital simulation of the robotics device 150, and the actual state of the robotics device 150 can be determined using the measurement module 145 for comparison to the predicted state. Control signals provided by the device control module 130 are communicated to the robotics devices 150 via the input/output components 120 using a wired and/or wireless connection, such as using one or more cables, using a WiFi or Bluetooth connection, using radio frequency (RF) signals, or the like.

The neural network module 140 stores, provides, accesses, and/or trains one or more models of the system, such as a neural network, an AI model, or a ML model. A "model," as used herein, can refer to a construct trained using training data to make predictions, provide probabilities, and/or generate outputs for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: AI models, ML models, neural networks, support vector machines, decision trees, Parzen windows, probability distributions, random forests, and others. Models can be configured for various situations, data types, sources, and output formats.

In some implementations, a model of the system can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer,") one or more nodes can produce a value classifying the input that, once the model is trained, can be used to generate predictions and/or outputs based on inputs (e.g., augmentations or modified predictions of robotics device states), and so forth. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of a neural network and/or parameters of the functions used at each node in the neural network (e.g., applying a loss function). Based on the results of the model evaluation, and after applying the described modifications, the model can then be retrained to evaluate new inputs.

In some implementations, a model trained and/or provided by the system 105 can comprise a State Augmentation Transformer, which can be a Temporal Fusion Transformer and/or another kind of neural network or other model configured to predict and/or augment state information of a robotics device. For example, neural network module 140 can implement a transformer-based architecture using Temporal Fusion Transformers or other models to model respective component classes, such as an actuator class and a structural element class. Using such an architecture, the system 105 can evaluate a robotics device 150 based on building blocks (e.g., components), rather than a simulation of an entire robot. In some implementations, a trained model generates augmentations to minimize a difference between an augmented state and a measured state based on a decoupled state (e.g., a predicted state), one or more constraint forces, and a partial state measurement (e.g., measured state data).

The neural network module 140 can store, access, and/or generate one or more training datasets for training one or more models. Generating a training dataset can include comparing measured state data for a robotics device (e.g., provided by the measurement module 145) with simulated measurement data based on a digital simulation (e.g., provided by the digital simulation module 125). Using a training dataset, the neural network module 140 trains a model to predict a state of a robotics device 150. For example, the trained model can generate augmentations, correction factors, or corrected predictions for a digital simulation provided by the digital simulation module 125. Additionally or alternatively, the trained model can generate new predictions for states of a robotics device 150. In some implementations, the trained model can generate new digital simulations of robotics devices 150 to provide improved predictions of states of the robotics devices 150.

In some implementations, a model of the neural network module 140 can be trained using a first robotics device 150 and applied to a second robotics device 150 different from the first robotics device 150. In some implementations, the second robotics device 150 can comprise different components or elements, such as different actuators and/or structural elements, which can be of a same type as those of the first robotics device 150. Advantageously, the system 105 enables training of generic models that can be applied across various robotics devices 150, regardless of whether the different devices use the same components. In some examples, the models can be specific to a subsystem of a robotics device 150 to further enable scaling of models (e.g., such that the models can be applied to a different robotics device that includes a similar subsystem). In these and other implementations, the system 105 is scalable, such that the system can model different actuators and/or structural elements that function in a similar way. For example, although actuators may use different mechanical or electrical technologies, the system 105 can nonetheless model the actuators in a similar way based on their functions, rather than the specific underlying technology.

The measurement module 145 receives and/or generates one or more measurements to determine state information of the robotics devices 150. For example, the measurement module 145 can determine an amount of linear and/or rotational motion of a structural element or an actuator included in a robotics device 150. The measurement module 145 can determine measurements, for example, using one or more sensors included in the input/output components 120, included in a peripheral or accessory device coupled to the system 105, and/or included in a robotics device 150. The measurement module 145 can implement various technologies for generating, estimating, and/or determining measurements, such as computer vision technology. Measurements generated using the measurement module 145 can be used to train one or more models provided by the neural network module 140, such as for calculating a loss function based on the measurements and simulated measurements generated using the digital simulation module 125. A loss function can include, for example, a physics-informed term that penalizes differences between the time derivative of the position and the velocity of a component (e.g., based on a time-varying state of at least a portion of a robotics device 150).

In some implementations, the measurement module 145 generates and/or provides other measurement data, such as electrical data. For example, the measurement module 145 can determine current, voltage, resistance, or impedance associated with components of a robotics device, and this electrical data can be used to generate predictions.

In some implementations, more or fewer modules and/or components can be included in the system 105. For example, in some implementations, digital simulations of the robotics devices 150 can be provided using a separate system, and the system 105 can generate augmentations to be provided to the separate system. In some implementations, the system 105 can be provided via a computing system (e.g., computing device 200 of FIG. 2) and/or a server computer (e.g., to be accessed via one or more networks, such as the Internet). In some implementations, at least a portion of the system 105 resides on the server, and/or at least a portion of the system 105 resides on a user device. In some implementations, at least a portion of the system 105 can reside in the one or more robotics devices 150.

Figure 2:
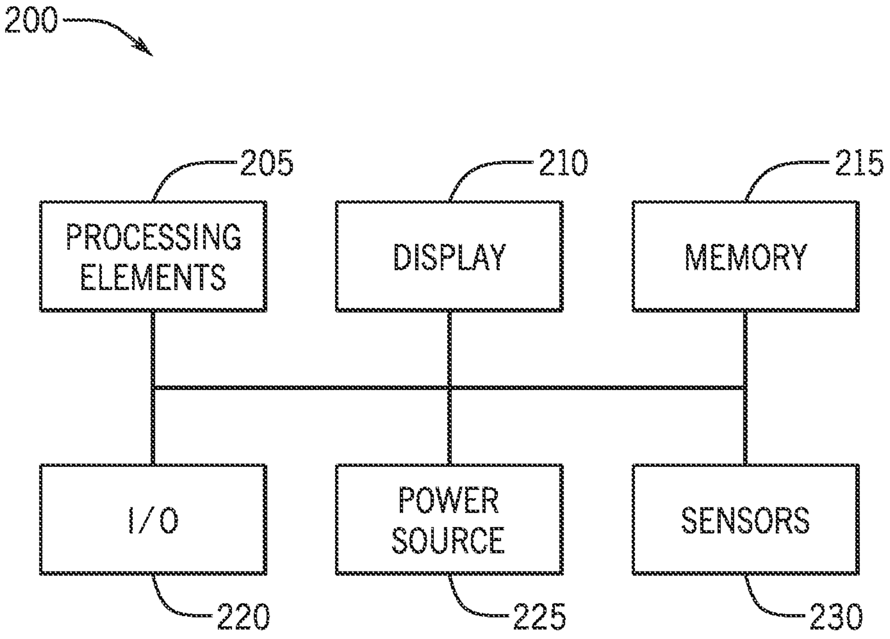
FIG. 2 is a block diagram illustrating a computing device implementing a robotics device simulation system, in some implementations.

FIG. 2 is a block diagram illustrating a computing device 200 implementing a robotics device simulation system (e.g., system 105), in some implementations. For example, at least a portion of the computing device 200 can comprise the system 105, or at least a portion of the system 105 can comprise the computing device 105. In some implementations, the computing device 105 can comprise at least a portion of a robotics device 150.

The computing device 200 includes one or more processing elements 205, displays 210, memory 215, an input/output interface 220, power sources 225, and/or one or more sensors 230, each of which may be in communication either directly or indirectly.

The processing element 205 can be any type of electronic device and/or processor (e.g., processor 110) capable of processing, receiving, and/or transmitting instructions. For example, the processing element 205 can be a microprocessor or microcontroller. Additionally, it should be noted that select components of the system may be controlled by a first processor and other components may be controlled by a second processor, where the first and second processors may or may not be in communication with each other. The device 200 may use one or more processing elements 205 and/or may utilize processing elements included in other components. For example, the device 200 implementing the system 105 can use the processor 110 and/or a different processor residing on one or more robotics devices 150.

The display 210 provides visual output to a user and optionally may receive user input (e.g., through a touch screen interface). The display 210 may be substantially any type of electronic display, including a liquid crystal display, organic liquid crystal display, and so on. The type and arrangement of the display depends on the desired visual information to be transmitted (e.g., can be incorporated into a wearable item such as glasses, or may be a television or large display, or a screen on a mobile device).

The memory 215 (e.g., memory/storage 115) stores data used by the device 200 to store instructions for the processing element 205, as well as store data for the robotics device simulation system, such as robotics device data, digital simulations, simulated environments, training datasets, trained models, measurement data, modules of the system 105, and so forth. The memory 215 may be, for example, magneto-optical storage, read only memory, random access memory, erasable programmable memory, flash memory, or a combination of one or more types of memory components. The memory 215 can include, for example, one or more non-transitory computer-readable media carrying instructions configured to cause the processing element 205 and/or the device 200 or other components of the system to perform operations described herein.

The I/O interface 220 provides communication to and from the various devices within the device 200 and components of the computing resources to one another. The I/O interface 220 can include one or more input buttons, a communication interface, such as WiFi, Ethernet, or the like, as well as other communication components, such as universal serial bus (USB) cables, or the like. In some implementations, the I/O interface 220 can be configured to receive voice inputs and/or gesture inputs.

The power source 225 provides power to the various computing resources and/or devices. The robotics device simulation system may include one or more power sources, and the types of power source may vary depending on the component receiving power. The power source 225 may include one or more batteries, wall outlet, cable cords (e.g., USB cord), or the like. In some implementations, a device 200 implementing the system 105 can be coupled to a power source 225 residing on one or more robotics devices 150.

The sensors 230 may include sensors incorporated into the robotics device simulation system. The sensors 230 are used to provide input to the computing resources that can be used to generate and/or modify simulations or augmentations, receive measurements, generate training datasets, and so forth. For example, the sensors 230 can include one or more cameras or other image capture devices for capturing images and/or measurement data by the measurement module 145. Additionally or alternatively, the sensors 230 can use other technologies, such as computer vision, light detection and ranging (LIDAR), laser, radar, and so forth.

Components of the device 200 are illustrated only as examples, and illustrated components can be removed from and/or added to the device 200 without deviating from the teachings of the present disclosure. In some implementations, components of the device 200 can be included in multiple devices, such as a user device and a robotics device (e.g., 150 of FIG. 1). For example, sensors 230 can be included in a robotics device and/or in a user device implementing the system 105.

Figure 3:
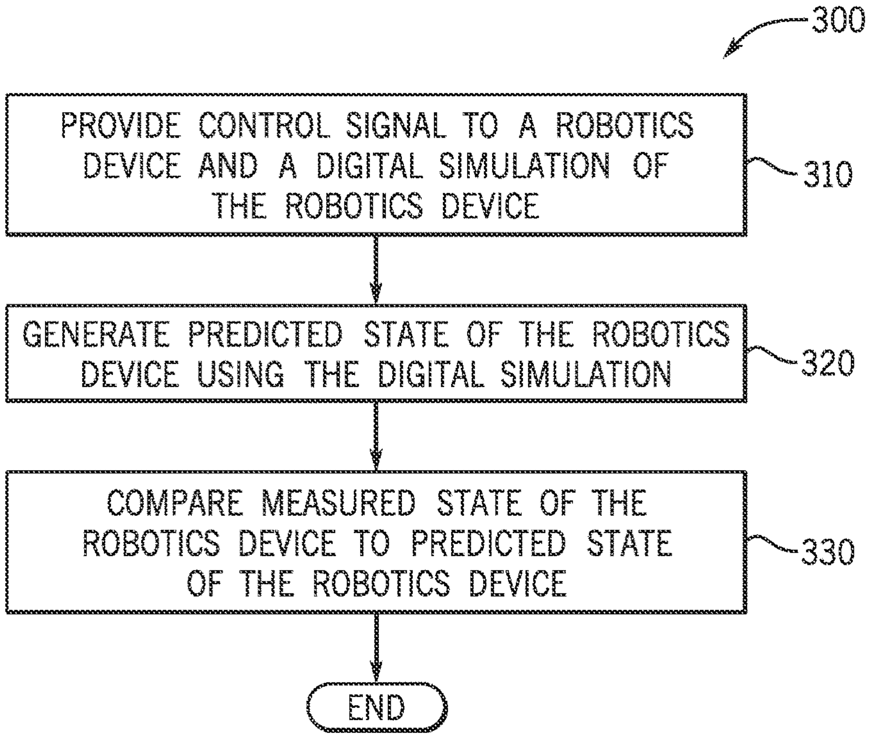
FIG. 3 is a flow diagram illustrating a process performed using a robotics device simulation system, in some implementations.

FIG. 3 is a flow diagram illustrating a process 300 performed using a robotics device simulation system (e.g., system 105), in some implementations. The process 300 can be performed to compare a measured state of a robotics device to a predicted state of the robotics device generated using a digital simulation of the robotics device. The comparison can then be used to train a model to generate augmentations (e.g., correction factors, new and/or modified predictions, augmented digital simulations). For example, the comparison can be used to generate a training dataset and/or to calculate a loss function.

The process 300 begins at block 310, where a control signal is provided to a robotics device and to a digital simulation of the same robotics device. For example, the control signal can be provided by the device control module 130 to a robotics device 150 and to a digital simulation provided and/or accessed using the digital simulation module 125. The control signal comprises a command for the robotics device to perform one or more operations or actions, such as movement of an actuator and/or a structural element. The command can be for the robotics device to perform a predefined task, such as to move a robot from a first physical location to a second physical location, to move or interact with an external object, to perform a gesture or movement (e.g., to wave a robotic hand, perform a dance, climb stairs). More generally, the command can be for the robotics device to perform any action.

The process 300 proceeds to block 320, where a predicted state of the robotics device after performance of the command is generated. For example, the robotics device simulation system and/or an external system (e.g., a robotics simulator) can receive the control signal provided at block 310 and cause the digital simulation of the robotics device to perform one or more actions specified by the control signal. After performance of the one or more actions, the predicted state can be determined, such as by determining a position of one or more components in the digital simulation (e.g., a position of an actuator and a position of a structural element). Generating the predicted state can comprise causing operations to be performed in relation to various components of the digital simulation of the robotics device, such as estimating force or torque on one or more components, modeling behavior or characteristics of one or more components (e.g., weight, mass, deformation, friction), and so forth.

The process 300 proceeds to block 330, where a measured or actual state of the robotics device is compared to the predicted state of the robotics device generated at block 320. For example, various sensors can be used to determine the actual state of the robotics device for comparison to the predicted state. The comparison performed at block 330 can be used, for example, to generate training data for a model provided by the system, such as data used in the process 400 of FIG. 4.

The process 300 can be performed any number of times. For example, the process 300 can be repeated hundreds or thousands of times using the same control signals and/or different control signals to generate training data for training a model and/or to iteratively train the model.

In some implementations, at least a portion of the process 300 can use a model trained and/or provided by the system (e.g., trained according to the process 400). For example, the prediction generated at block 320 can be provided using a neural network or other model provided by the system, and the comparison performed at block 330 can be used to assess accuracy of the neural network and/or to modify weights included in the neural network.

Figure 4:
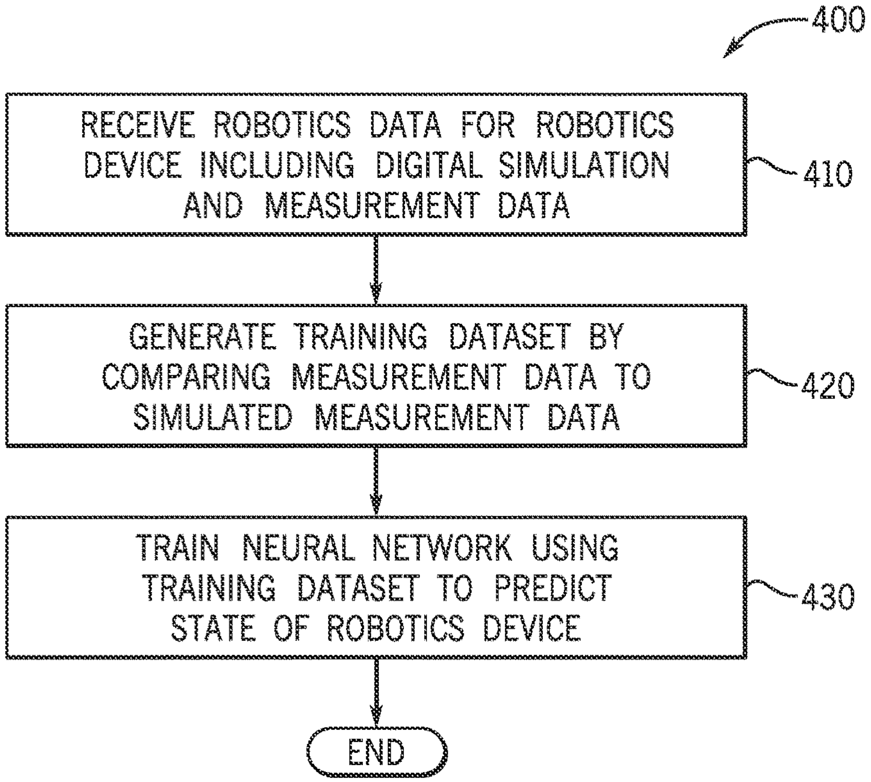
FIG. 4 is a flow diagram illustrating a process performed using a robotics device simulation system, in some implementations.

FIG. 4 is a flow diagram illustrating a process 400 performed using a robotics device simulation system, in some implementations. The process 400 can be performed to train a model (e.g., a neural network and/or other AI or ML model) to generate state predictions for a robotics device, such as predicted movements or positions, augmentations/correction factors for predicted movements or positions, or the like.

The process 400 begins at block 410, where robotics data is received for at least one robotics device, including indications of a set of components of the robotics device, a digital simulation of the at least one robotics device, and measurement data (e.g., the measured or actual state of the robotics device generated at block 330 of FIG. 3) received from at least one sensor associated with the at least one robotics device. The set of components includes at least one actuator and at least one structural element. In some implementations, the set of components further includes a mechanical element, an electrical element, or both. In some implementations, at least some components in the set of components are associated with respective component classes, such as various actuator classes (e.g., linear actuator, rotational actuator, classes indicating a range of motion, classes indicating functional characteristics of an actuator), various structural element classes (e.g., materials, dimensions, or shapes of structural elements), and so forth. In some implementations, the at least one sensor comprises a sensor included in the at least one actuator.

The process 400 proceeds to block 420, where a training dataset is generated using the received robotics data. Generating the training dataset can include comparing the measurement data with simulated measurement data based on the digital simulation. For example, a predicted state of the robotics device can be generated using the digital simulation of the robotics device, as described with reference to block 320 of the process 300 of FIG. 3, and the predicted state can be compared to the measurement data (e.g., to calculate a loss function).

The process 400 proceeds to block 430, where a neural network is trained using the generated training dataset to modify the digital simulation of the at least one robotics device to predict a state of the at least one robotics device. In some implementations, a different model is additional or alternatively trained, such as a different AI or ML model. In some implementations, multiple models are trained, such as different models to make predictions for different subsystems or components of the robotics device. In some implementations, training the model includes training a first model associated with a first component class and training a second model associated with a second component class. For example, a separate model (e.g., State Augmentation Transformer) can be trained for each component class. In some implementations, the first component class is an actuator class and the second component class is a structural element class. In some implementations, models include a State Augmentation Transformer. In some implementations, predicting the state of the at least one robotics device includes receiving an initial estimate of the state and generating an additive residual value for the state (e.g., an augmentation, correction factor, or corrected value).

In some implementations, the process 400 further includes applying the trained neural network to the at least one robotics device or a different robotics device to predict a future state.

In some implementations, the predicted state of the at least one robotics device comprises a movement or position of the at least on actuator, the at least one structural element, or both the at least one actuator and the at least one structural element.

In some implementations, the process 400 further includes evaluating accuracy of the trained model and retraining the model based on comparing the accuracy of the trained model to a threshold value. Retraining the model can include adjusting weights associated with the model and/or training the model for one or more additional iterations using the same training dataset or a different training dataset. In these and other implementations, at least a portion of the training data can be held back as testing data, and the process 400 can include generating a testing dataset using the testing data.

Operations can be added to or removed from the processes 300 and 400 without deviating from the teachings of the present disclosure. One or more operations of the processes 300 and 400 can be performed in any order, including performing operations in parallel, and the processes 300 and 400 or portions thereof can be repeated any number of times.

The disclosed systems and method advantageously allow digital simulations of robotics devices to be generated and/or configured quickly and accurately based on actual, measured state information associated with the robotics devices. The disclosed technology provides more accurate digital simulations of robotics devices, and the disclosed technology enables digital simulations that are flexible and scalable, such as providing trained models that can be applied to multiple robotics devices independent of specific components or elements included in a robotics device (e.g., based on component classes or functional characteristics of components or elements).

In some embodiments, a time-varying simulation state of a robotics device is split into simulation states of individual building blocks (e.g., actuators and rigid components/structural elements). To isolate these building blocks, the forces and torques that act from one building block onto another are determined. From there, the system can identify an augmentation for specific types of building blocks. The system and method can be expanded, e.g., an augmentation can be determined for finite elements of a flexible body. An augmentation model can be created for building block types for a robotics device and the augmentation can augment the simulation representation of any robotics device made of building blocks of these types without having to retrain or acquire new data. Relatedly, although a transformer neural network architecture is disclosed, the architecture may be varied based on the types of AI models and the like. In short, utilizing different neural networks or other AI/ML models can be used to generate more accurate "digital twins" for robotics devices, allowing faster development and learning of the devices the sim-to-real gap is reduced as compared to conventional simulation methods.

The technology described herein can be implemented as logical operations and/or modules in one or more systems. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations can be performed in any order, unless explicitly claimed otherwise or unless a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology can be employed in special-purpose devices independent of a personal computer.

The above specification, examples and data provide a complete description of the structure and use of example embodiments as defined in the claims. Although various example embodiments are described above, other embodiments using different combinations of elements and structures disclosed herein are contemplated, as other implementations can be determined through ordinary skill based upon the teachings of the present disclosure. It is intended that all matter contained in the above description and shown in the accompanying drawings shall be interpreted as illustrative only of particular embodiments and not limiting. Changes in detail or structure can be made without departing from the basic elements as defined in the following claims.

What is claimed is:

1. A computer-implemented method of training a neural network to predict states of a robotics device, the method comprising:

receiving robotics data for at least one robotics device, wherein the robotics data includes indications of a set of components comprising at least one actuator and at least one structural element, a digital simulation of the at least one robotics device, and measurement data received from at least one sensor associated with the at least one robotics device;

generating, using the received robotics data, a training dataset, wherein generating the training dataset includes comparing the measurement data with simulated measurement data based on the digital simulation;

training, using the generated training dataset, a neural network to modify the digital simulation of the at least one robotics device to predict a state of the at least one robotics device;

modifying the digital simulation of the at least one robotics device using the trained neural network; and applying the trained neural network to a different robotics device to predict a future state of the different robotics device, wherein the different robotics device includes a different set of components comprising, in part, different mechanical components.

2. The computer-implemented method of claim 1, wherein training the neural network includes training a first model associated with a first component class and training a second model associated with a second component class.

3. The computer-implemented method of claim 2, wherein the first component class is an actuator class and the second component class is a structural element class.

4. The computer-implemented method of claim 2, wherein the first model and the second model each comprise a State Augmentation Transformer.

5. The computer-implemented method of claim 1, wherein predicting the state of the at least one robotics device includes receiving an initial estimate of the state and generating an additive residual value for the state.

6. The computer-implemented method of claim 1, wherein the predicted state of the at least one robotics device comprises a movement or position of the at least one actuator, the at least one structural element, or both the at least one actuator and the at least one structural element.

7. The computer-implemented method of claim 1, wherein the at least one sensor comprises a sensor included in the at least one actuator.

8. The computer-implemented method of claim 1, wherein the set of components includes a mechanical element, an electrical element, or both.

9. The computer-implemented method of claim 1, wherein the set of components includes an electrical element, and wherein the measurement data includes electrical measurements associated with the electrical element.

10. The computer-implemented method of claim 1, wherein the at least one robotics device includes a plurality of subsystems and the neural network comprises a model for each subsystem of the plurality of subsystems.

11. The computer-implemented method of claim 1, further comprising:

providing a control signal to the at least one robotics device, the control signal indicating a command to be executed by the at least one robotics device;

generating the measurement data based on performance of the command;

providing the control signal to the digital simulation of the at least one robotics device; and generating the simulated measurement data based on simulated performance of the command by the digital simulation of the at least one robotics device.

12. The computer-implemented method of claim 1, wherein the digital simulation of the at least one robotics device comprises a graphic representation.

13. The computer-implemented method of claim 1, further comprising:

generating a testing dataset;

evaluating accuracy of the trained neural network using the testing dataset; and retraining the trained neural network based on comparing the accuracy of the trained neural network to a threshold value.

14. A non-transitory computer-readable medium carrying instructions that, when executed by a processor, cause the processor to perform operations comprising:

receive robotics data for at least one robotics device, wherein the robotics data includes indications of a set of components comprising at least one actuator and at least one structural element, a digital simulation of the at least one robotics device, and measurement data received from at least one sensor associated with the at least one robotics device;

generate, using the received robotics data, a training dataset, wherein generating the training dataset includes comparing the measurement data with simulated measurement data based on the digital simulation; and train, using the generated training dataset, a neural network to modify the digital simulation of the at least one robotics device to predict a state of the at least one robotics device;

modify the digital simulation of the at least one robotics device using the trained neural network; and apply the trained neural network to a different robotics device to predict a future state of the different robotics device, wherein the different robotics device includes a different set of components comprising, in part, different mechanical components.

15. The non-transitory computer-readable medium of claim 14, wherein training the neural network includes training a first model associated with a first component class and training a second model associated with a second component class.

16. The non-transitory computer-readable medium of claim 15, wherein the first component class is an actuator class and the second component class is a structural element class.

17. The non-transitory computer-readable medium of claim 15, wherein the first model and the second model each comprise a State Augmentation Transformer.

18. The non-transitory computer-readable medium of claim 14, wherein predicting the state of the at least one robotics device includes receiving an initial estimate of the state and generating an additive residual value for the state.

* * * * *